(12) United States Patent
Pomerantz et al.

(10) Patent No.: US 7,925,884 B2
(45) Date of Patent: Apr. 12, 2011

(54) FRAUD DETECTION IN SEALS

(75) Inventors: Ori Pomerantz, Austin, TX (US); Louis Thomas Fuka, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 12/165,348

(22) Filed: Jun. 30, 2008

(65) Prior Publication Data

US 2009/0324027 A1 Dec. 31, 2009

(51) Int. Cl.
*H04L 9/00* (2006.01)
(52) U.S. Cl. .......................... 713/178; 382/124
(58) Field of Classification Search .................. 713/176, 713/178, 186; 382/115, 121, 123, 124
See application file for complete search history.

(56) References Cited

U.S. PATENT DOCUMENTS

| | | | |
|---|---|---|---|
| 4,718,102 A | 1/1988 | Crane | |
| 5,938,706 A * | 8/1999 | Feldman | ......................... 701/32 |
| 5,956,409 A | 9/1999 | Chan | |
| 6,351,550 B1 | 2/2002 | Inaoka | |
| 2004/0208343 A1* | 10/2004 | Golden et al. | ................. 382/110 |
| 2008/0023543 A1* | 1/2008 | Beisang | ........................ 235/382 |
| 2009/0174547 A1* | 7/2009 | Greene et al. | ............ 340/539.13 |
| 2010/0223663 A1* | 9/2010 | Morimoto et al. | ................. 726/7 |

FOREIGN PATENT DOCUMENTS

| | | |
|---|---|---|
| EP | 0 865 989 | 9/1998 |
| JP | 62-081517 | 4/1987 |

* cited by examiner

*Primary Examiner* — Beemnet W Dada
(74) *Attorney, Agent, or Firm* — Jeff LaBaw, Esq.; McGinn IP Law Group, PLLC

(57) ABSTRACT

A method of verifying a carved seal includes detecting a pressure on a carved seal stamp is detected through pins extending from a face of the carved stamp steal. It is determined if the pressure indicates that the seal is being pressed. A fingerprint of a user of the seal is read when it is determined that the seal is being pressed. An image of an object being stamped by the seal is photographed if the pressure indicates that the seal is being pressed. A time that the seal is being pressed is determined if the pressure indicates that the seal is being pressed. A location of the seal is determined if the pressure indicates that the seal is being pressed. An audio note is recorded if the pressure indicates that the seal is being pressed. The fingerprint, time, and location is associated with the photograph of the image of the object being stamped by the seal. The information is encoded into a face of the seal to indicate that the fingerprint was determined to belong to an authorized user.

1 Claim, 7 Drawing Sheets

FRAUD DETECTION IN SEALS

BACKGROUND OF THE INVENTION

1. Field of the Invention

The present invention generally relates to a method and apparatus for detecting the fraudulent use of a seal.

2. Description of the Related Art

In some cultures, it is common to use seals to sign or otherwise authenticate documents. One example is the chop, a carved seal used instead of signatures. Chops, for example, are used in countries that include Japan, South Korea, and China.

Conventional seals suffer from the same image reproduction vulnerabilities of western style signatures.

SUMMARY OF THE INVENTION

In view of the foregoing, and other, exemplary problems, drawbacks, and disadvantages of the conventional systems, it is an exemplary feature of the present invention to provide a method of verifying a carved seal.

An exemplary aspect of the method includes detecting a pressure on a carved seal stamp through pins extending from a face of the carved stamp steal, determining if the pressure indicates that the seal is being pressed, reading a fingerprint of a user of the seal when the determining has determined that the seal is being pressed, photographing an image of an object being stamped by the seal when the determining has determined that the seal is being pressed, determining a time that the seal is being pressed if the pressure indicates that the seal is being pressed, determining a location of the seal if the pressure indicates that the seal is being pressed, associating the fingerprint, time, and location with the photograph of the image of the object being stamped by the seal, and encoding information into a face of the seal to indicate that the fingerprint was determined to belong to an authorized user.

The present inventors have recognized, however, that these seals can be improved. An additional benefit of the present invention would be that the seal itself can actually be proof that the person wielding the seal was authorized to do so.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENT OF THE INVENTION

Figure 1:
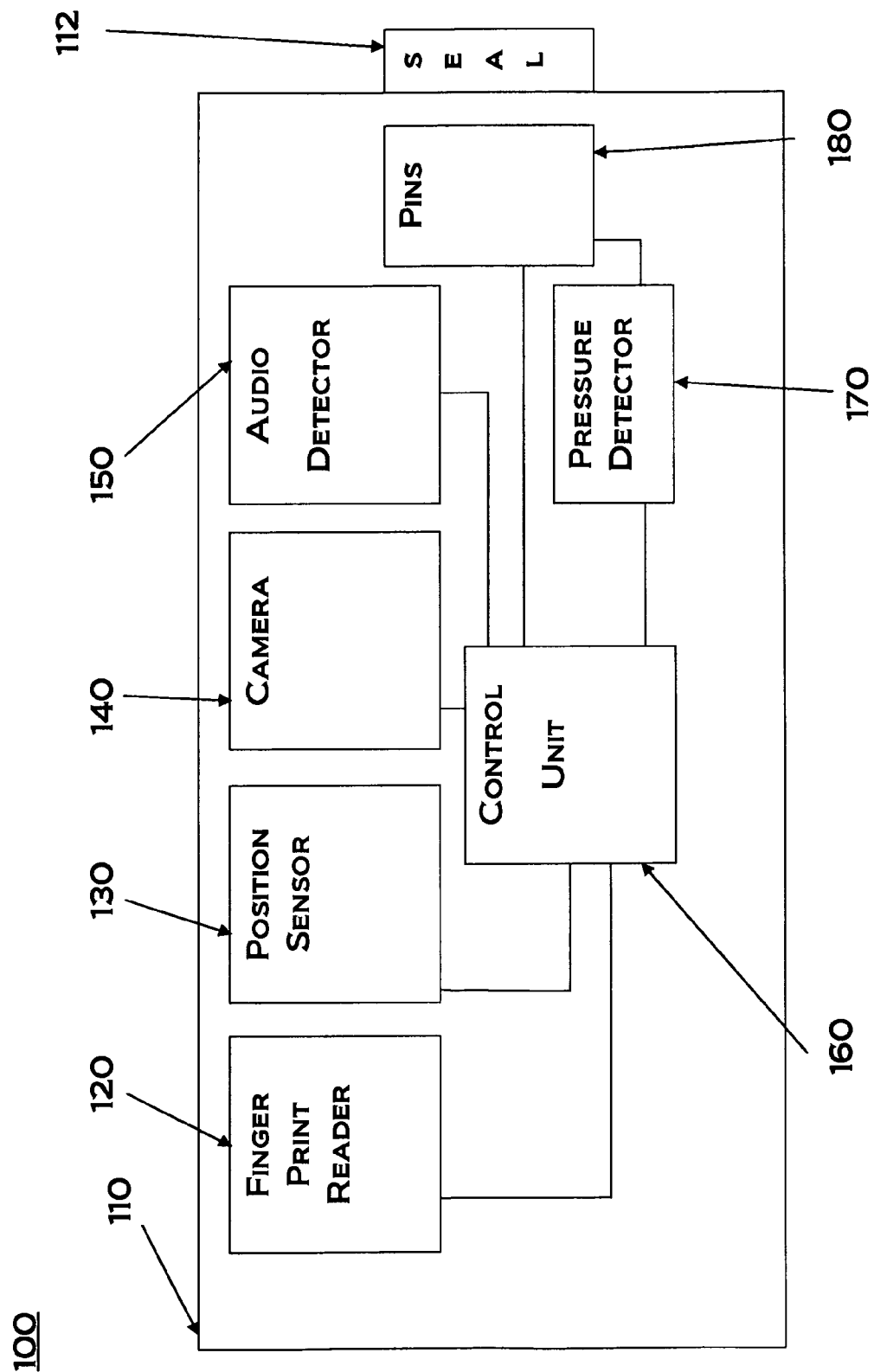
FIG. 1 illustrates an exemplary system 100 for providing a secure seal.

Referring now to the drawings, and more particularly to FIGS. 1-7, there are shown exemplary embodiments of the method and structures according to exemplary aspects of the present invention.

FIG. 1 illustrates an exemplary seal system 100. Referring to FIG. 1, seal system 100 exemplarily includes seal body 110. Seal face 112 may be provided on one end of seal body 110. Seal body 110 and seal face 112 may be formed or carved from stone, wood, plastic, ceramic, or metal.

Seal body 110 may also include fingerprint reader 120, position sensor 130, camera 140, audio detector 150, control unit 160, pressure detector 170, and pins 180. Control unit 160 may be configured to control an operation of seal system 100.

Pressure detector 170 would exemplarily determine that the seal is being operated. For example, pressure detector 170 may determine that seal face 112 is being placed against a surface to perform a seal. Alternately, another mechanism may determine that the seal system 100 is being operated. For example, a button may simply be pressed. Exemplarily, once seal system 100 is activated, by pressing the seal face 112 down for example, control unit 160 would authorize fingerprint reader 120 to operate.

Fingerprint reader 120 may be provided on seal body 110 in such a position that a user's fingerprint can be read and scanned. Exemplarily, fingerprint reader 120 is associated with control unit 160. Control unit 160 may determine whether the fingerprints read by fingerprint reader 160 are of an authorized user. Exemplarily, control unit 160 would have a memory unit (not illustrated) to store the fingerprints of authorized users. Additionally, control unit 160 may, once a user is authorized, allow other functions of seal system 100 to occur.

Position sensor 130 may be configured to determine a position of seal body 110 during use. For example, position sensor 130 may include a global positioning satellite monitor (GPS) to determine where the seal system 100 was operated during a sealing operation. Other position sensing systems known in the art could alternatively be used.

Camera 140 may also be activated by control unit 160. Camera 140 would take an image or photograph of the document or surface being sealed during the sealing operation. Exemplarily, camera 140 would take a 360 degree image of every portion of the document being sealed. However, other camera and image arrangements may be provided.

Audio detector 150 includes a microphone to record any sounds or audio notes during the sealing operation. For example, a user may decide to dictate that the sealing has taken place for later voice verification.

Pin unit 180 may be activated by control unit 160 after the seal system 100 user is authenticated. Pin unit 180 can be configured to extend pins through seal face 112 to indicate that a seal system 100 has authenticated the user. That is, the resulting seal may change to indicate that the seal is authorized. Pin unit 180 may contain a magnetic, hydraulic, pneumatic, or other system to extend the pins.

In some embodiments, pin unit 180 is associated with pressure detector 170. For example, pressure detector 170 may measure a pressure determined by pins of pin unit 180 to determine whether the seal system 100 is being used. That is, as seal body 100 is pressed down, the pins of pin unit 180 would indicate that they are being pushed.

Figure 3:
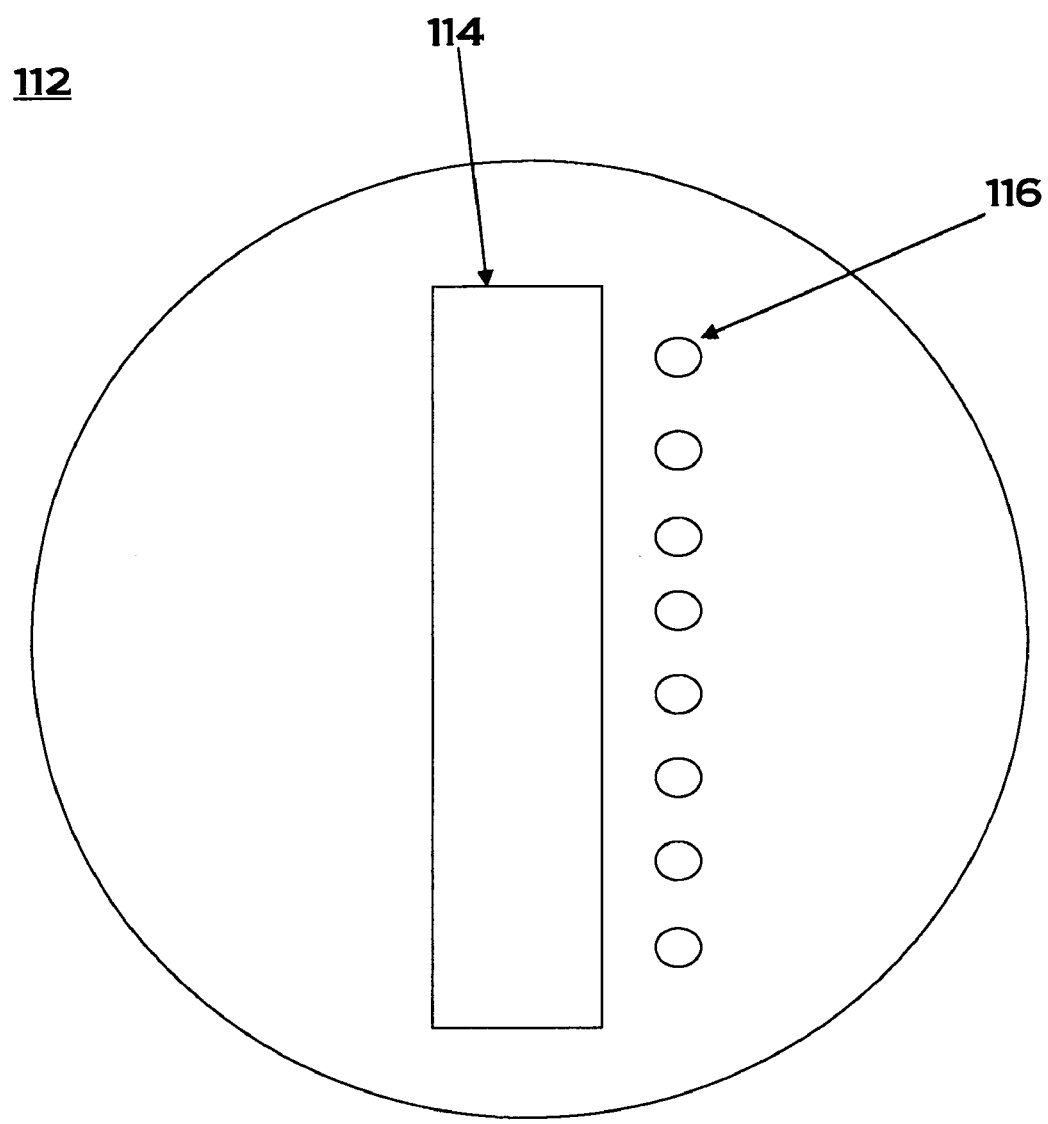
FIG. 3 illustrates an exemplary seal 112.

Exemplarily, pin unit 180 would extend pins through seal face 112 to alter the face of seal face 112. FIG. 3 is an exemplary schematic illustration of seal face 112. Referring to FIG. 3, seal face 112 exemplarily includes a seal carving 114 and pins 116. Pins 116 would be associated with pin unit 180 so that pin unit 180 would control each of pins 116.

Seal carving 114 may be any image desired by the user. Pins 116 may be any shape array of any number of pins that may be configured to communicate that the sealing was authorized. In addition, different arrangements of pins 116 may be activated by control unit 160 to indicate a time, place, or user that used seal system 100.

Figure 4:
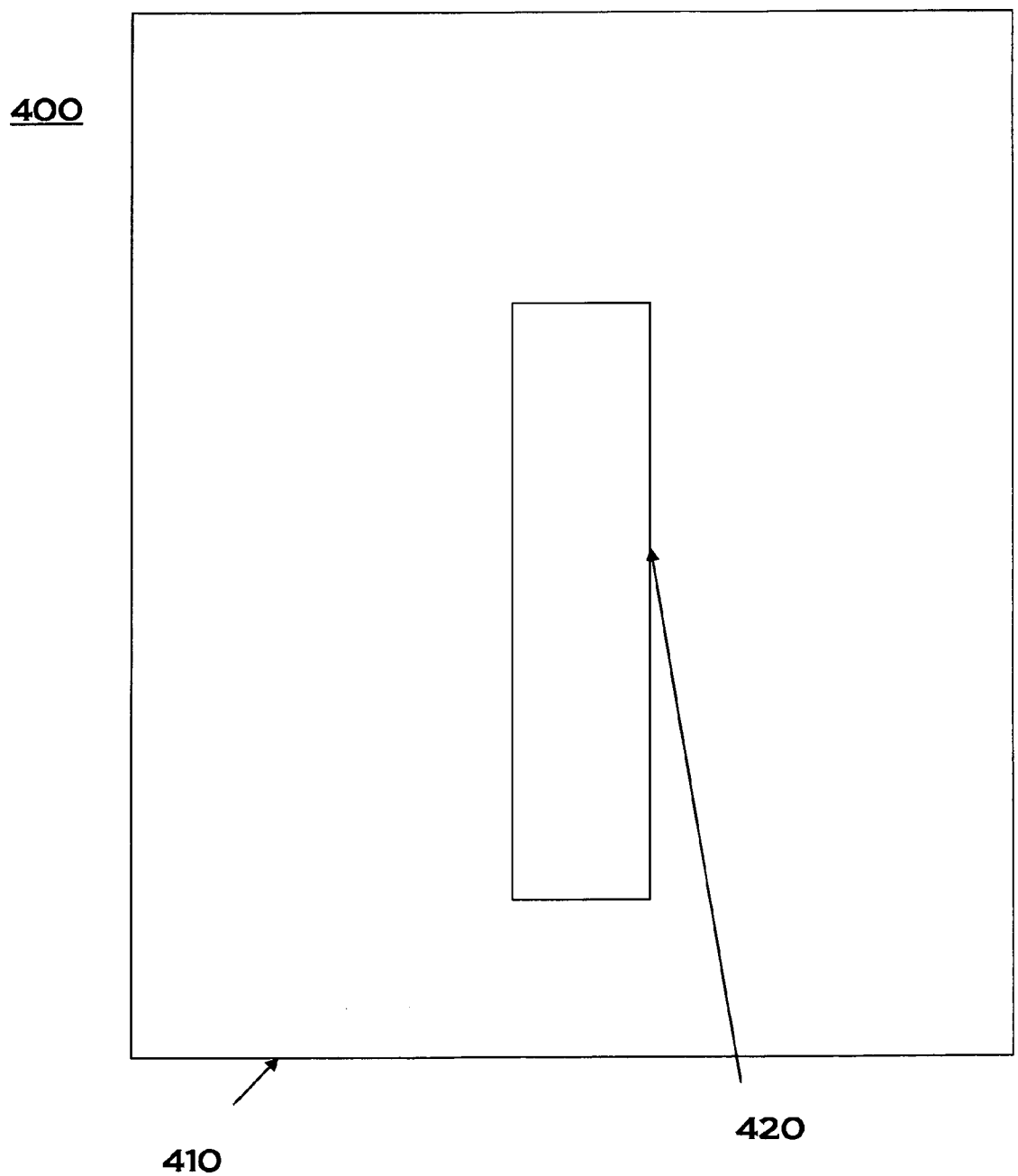
FIG. 4 illustrates an exemplarily sealed document 400 that has not been verified.

FIG. 4 is an exemplary illustration of document 400 that has been sealed by seal system 100. Referring to FIG. 4, seal system has provided an unauthorized seal impression 420 on document 400. That is, seal face 112 has left an impression, but there is no impression left by pins 116.

Figure 5:
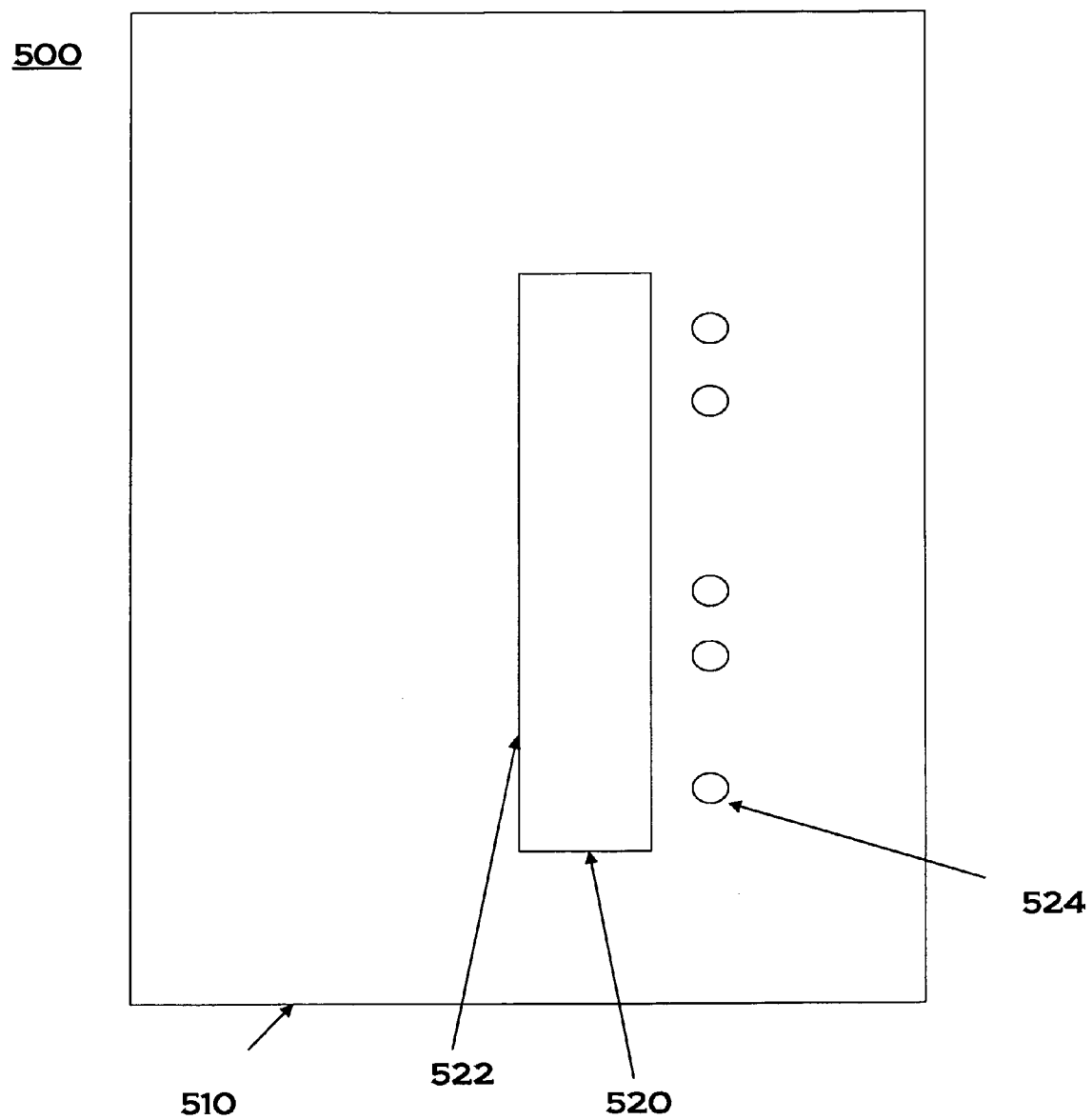
FIG. 5 illustrates an exemplarily sealed document 500 that has been verified.

On the other hand, FIG. 5 illustrates document 500 that has been sealed and authenticated by seal system 100. Referring to FIG. 5, document 500 includes seal impression 520. Seal impression 520 includes seal face impression 522 and pin impression 524. In FIG. 5, an exemplary coded pin impression 524 is illustrated where the order and placement of the dots may indicate a message or other status indicator. That is, in FIG. 5, not every available pin was deployed.

Referring to FIGS. 4 and 5, a user can distinguish between an unauthorized seal such as seal impression 420 and an authorized seal impression 520. Additionally, control unit 160 may provide additional information regarding the sealing by disclosing the time, location, fingerprints, and audio signature of the seal user.

Figure 2:
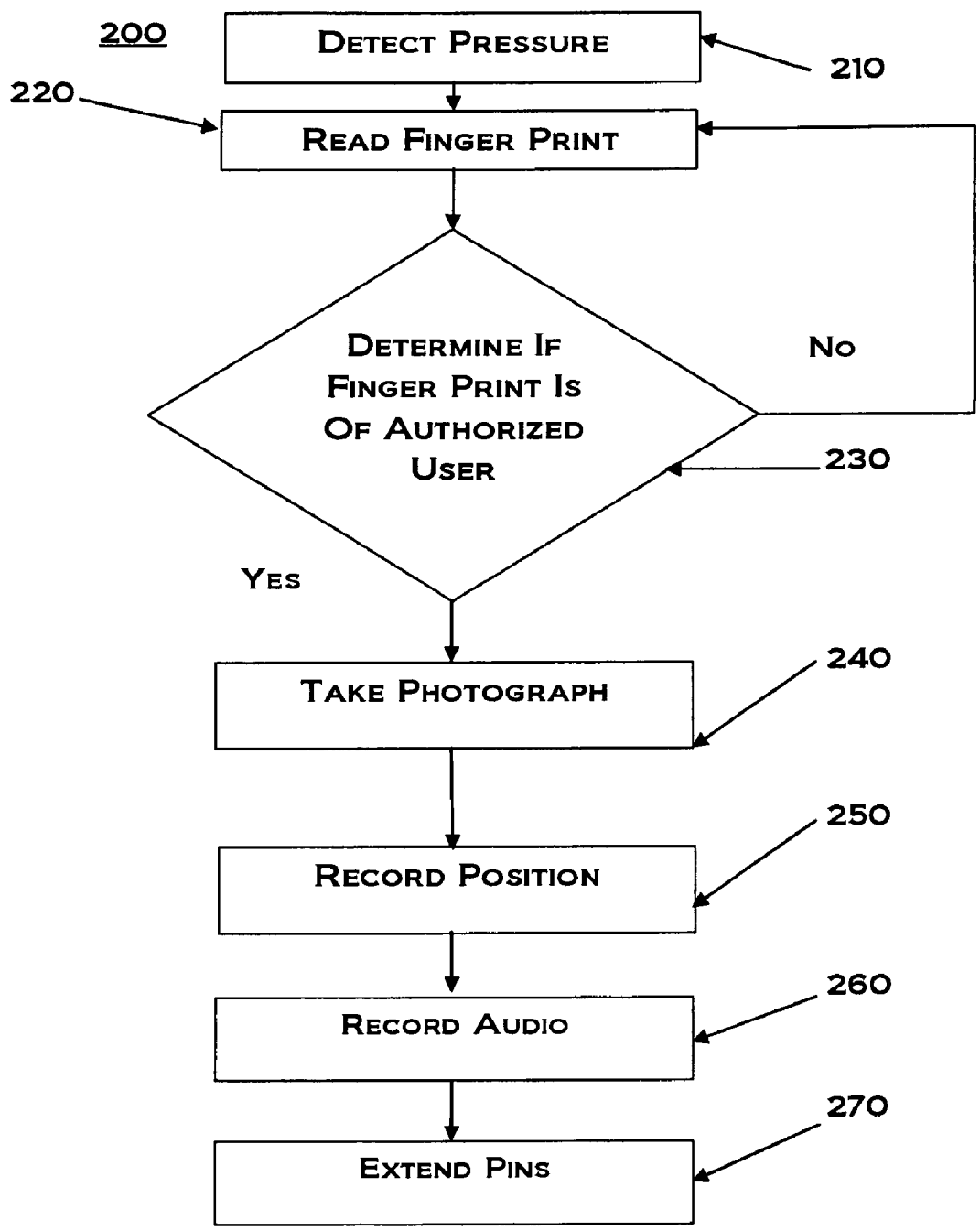
FIG. 2 illustrates an exemplary method 200 for providing a secure seal.

FIG. 2 is an illustration of an exemplary method 200 of authenticating a sealed document. Referring now to FIG. 2, method 200 includes Step 210 to detect the pressure or other activation of the seal.

In Step 220, a fingerprint is read once the seal has been activated. In Step 230, it is determined whether the read fingerprint is from an authorized user. If the user is unauthorized, method 200 may simply return to Step 220 or otherwise inactivate the seal.

In Step 240, after Step 230 determines that the user is authorized, a photograph of the document may be taken. In addition, in Step 250, the position of the seal may be recorded. Finally, in Step 260, an audio recording may be made.

In Step 270, after Step 230 has determined that the user is authenticated, the pins may be extended through the seal face. Step 270 may also include directions to determine an arrangement of the pins. For example, the pins may be extended in different patterns depending on various conditions, including if a different user used the device or to also record the time into the seal image.

Although the exemplary embodiment described as a stand-alone device having control unit 160, the present invention could also be implemented as a device attached to a computer, such that various functions, such as the control unit is executed by the controlling computers. Other functions that might be outside the seal system 100 body might include the position sensors and the audio detector.

Figure 6:
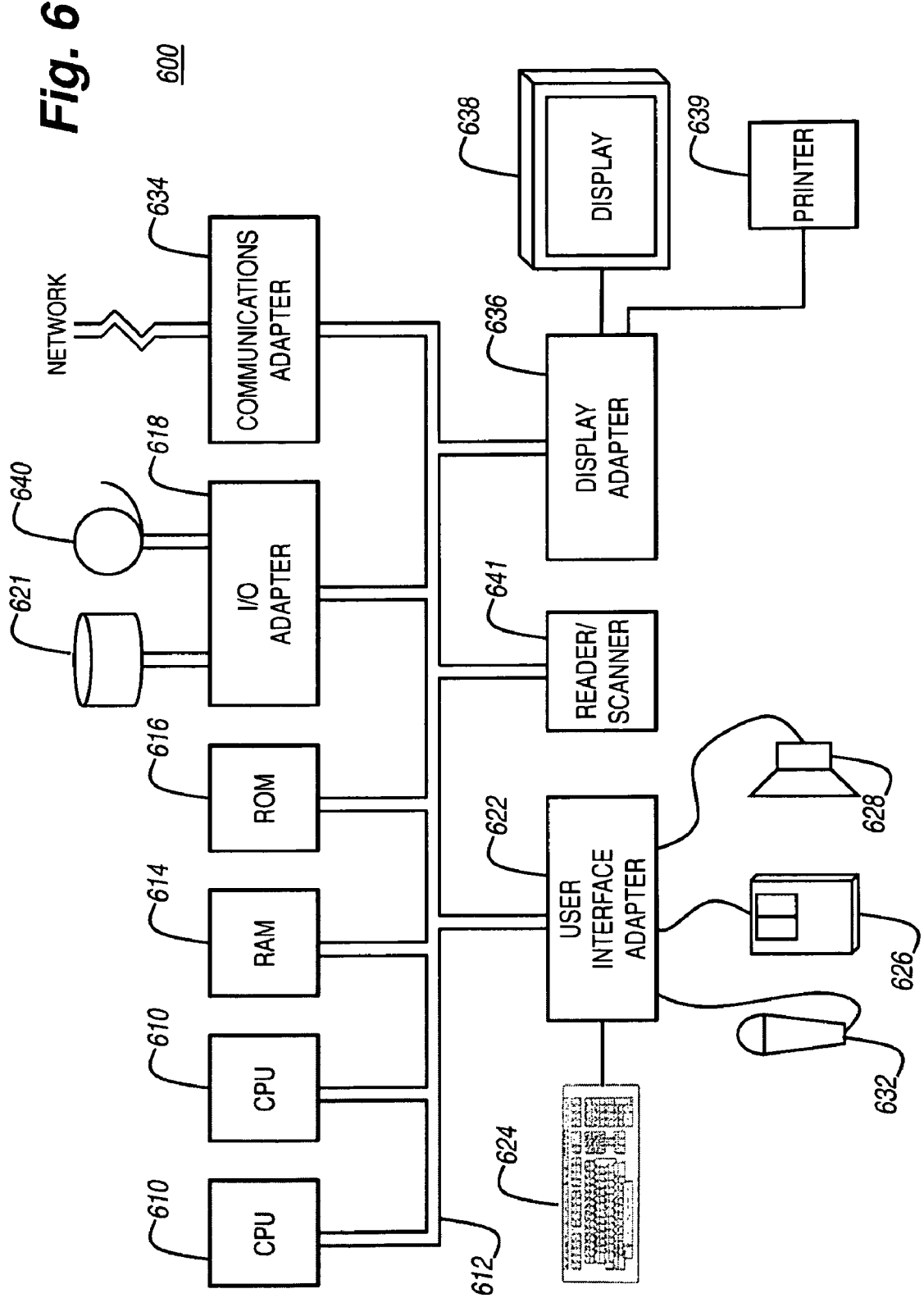
FIG. 6 illustrates a typical hardware configuration which may be used for implementing the computer system and method according to the exemplary aspects of the present invention.
Figure 7:
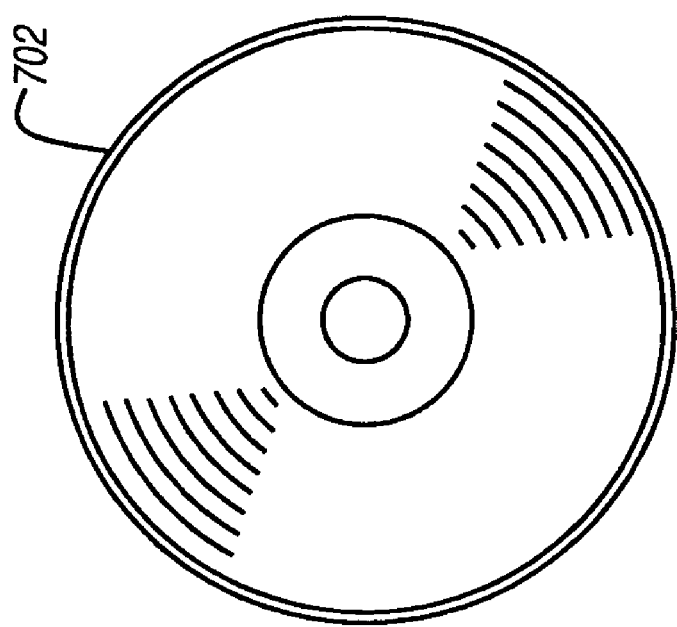
FIG. 7 illustrates a magnetic data storage diskette 600 to store the claimed method.
Figure 7:
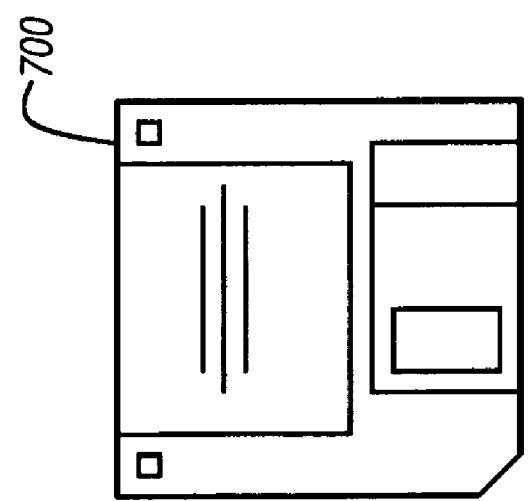

Therefore, referring now to FIG. 6, system 600 illustrates a typical hardware configuration which may be used for implementing the inventive system and method when an external computer is used. The configuration has at least one processor or central processing unit (CPU) 610. The CPUs 602 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612, along with the seal body 110 of the present invention, as modified to communicate with a computer), a communication adapter 634 for connecting an information handling system to a data processing network, the Internet, and Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating the CPU 610 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 610 and hardware above, to perform the method of the invention.

This signal-bearing media may include, for example, a RAM contained within the CPU 610, as represented by the fast-access storage for example. Alternatively, the instructions may be contained in another signal-bearing media, such as a magnetic data storage diskette 700 or CD-ROM 702, (FIG. 7), directly or indirectly accessible by the CPU 610.

Whether contained in the computer server/CPU 610, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

In the exemplary first embodiment, the instruction would typically be stored in a ROM of control unit 160.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

We claim:

1. A method of verifying a carved seal, the method comprising:

detecting a pressure on a carved seal stamp through pins extending from a face of the carved stamp steal;

determining if the pressure indicates that the seal is being pressed;

reading a fingerprint of a user of the seal when the determining has determined that the seal is being pressed;
photographing an object being stamped by the seal if the pressure indicates that the seal is being pressed;
determining a time that the seal is being pressed if the pressure indicates that the seal is being pressed;
determining a location of the seal when the determining if the pressure indicates that the seal is being pressed;
associating the fingerprint, time, and location with the photograph of the image of the object being stamped by the seal; and
encoding information into a face of the seal to indicate that the fingerprint was determined to belong to an authorized user.

* * * * *